US012771003B2

(12) United States Patent
Kunitama et al.

(10) Patent No.: US 12,771,003 B2
(45) Date of Patent: Oct. 20, 2026

(54) NONRECIPROCAL CIRCUIT ELEMENT

(71) Applicant: KYOSAN ELECTRIC MFG. CO., LTD., Yokohama (JP)

(72) Inventors: Hiroshi Kunitama, Yokohama (JP); Takuya Yoshida, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 169 days.

(21) Appl. No.: 18/703,940

(22) PCT Filed: Jun. 21, 2022

(86) PCT No.: PCT/JP2022/024753
§ 371 (c)(1),
(2) Date: Apr. 23, 2024

(87) PCT Pub. No.: WO2023/074044
PCT Pub. Date: May 4, 2023

(65) Prior Publication Data

US 2025/0007142 A1 Jan. 2, 2025

(30) Foreign Application Priority Data

Oct. 28, 2021 (JP) ................................ 2021-176774

(51) Int. Cl.
*H01P 1/365* (2006.01)
*H01P 1/387* (2006.01)

(52) U.S. Cl.
CPC .............. *H01P 1/365* (2013.01); *H01P 1/387* (2013.01)

(58) Field of Classification Search
CPC .. H01P 1/365; H01P 1/387; H01P 1/38; H01P 1/383; H01P 1/36; H01P 1/39; H01P 1/03
(Continued)

(56) References Cited

U.S. PATENT DOCUMENTS 4,034,377 A * 7/1977 Knox ........................ H01P 1/37 333/1.1
6,646,608 B2 * 11/2003 Yoneda .................. H01P 1/387 333/1.1

(Continued)

FOREIGN PATENT DOCUMENTS

EP 1487121 A1 12/2004
JP 3-263902 A 11/1991

(Continued)

OTHER PUBLICATIONS

Extended (Supplementary) European Search Report dated Aug. 6, 2025, issued in counterpart EP Application No. 22886381.7. (14 pages).

(Continued)

*Primary Examiner* — Andrea Lindgren Baltzell
*Assistant Examiner* — Abigail Amir Yaldo
(74) *Attorney, Agent, or Firm* — WHDA, LLP

(57) ABSTRACT

A nonreciprocal circuit element according to the present invention comprises a nonreciprocal unit provided with a ferrite, an electromagnet that applies a DC magnetic field to the ferrite, and conductors that are arranged so as to intersect with each other in an insulated state with respect to the ferrite and that have a plurality of shorted terminal ends. The nonreciprocal circuit element comprises reciprocal circuit units and a DC power supply control unit controlling DC current to be supplied to the electromagnet. The DC power supply control unit controls the DC current to be supplied to the electromagnet and controls a DC magnetic field to be applied to the electromagnet. By the control of the DC magnetic field, the center frequency of frequency characteristics of the nonreciprocal circuit element is matched with the frequency of a high-frequency signal, and insertion loss of the nonreciprocal circuit element is reduced.

10 Claims, 12 Drawing Sheets

(58) Field of Classification Search
USPC .................................................. 333/24.2, 1.1
See application file for complete search history.

(56) References Cited

U.S. PATENT DOCUMENTS

| | | | |
|---|---|---|---|
| 7,863,997 | B1 | 1/2011 | Alton et al. |
| 2018/0026323 | A1 | 1/2018 | Hino |

FOREIGN PATENT DOCUMENTS

| | | | |
|---|---|---|---|
| JP | 2011-55222 | A | 3/2011 |
| JP | 2012-195662 | A | 10/2012 |
| WO | 2016/158044 | A1 | 10/2016 |

OTHER PUBLICATIONS

Linkhart, D., Circulator Specification, Microwave Circulator Design, Second Edition, Jan. 30, 2014, p. 35-67. (34 pages).
Office Action dated Dec. 19, 2024, issued in counterpart KR Application No. 10-2024-7014754, with English translation. (11 pages).
International Search Report dated Sep. 20, 2022, issued in counterpart International Application No. PCT/JP2022/024753. (2 pages).
Office Action dated Apr. 15, 2026, issued in counterpart TW Application No. 111134709, with English translation. (7 pages).
Office Action dated May 4, 2026, issued in counterpart EP Application No. 22886381.7 (9 pages).

* cited by examiner

NONRECIPROCAL CIRCUIT ELEMENT

TECHNICAL FIELD

The present invention relates to a nonreciprocal circuit element that is a ferrite device, such as isolator or circulator, and in particular relates to a nonreciprocal circuit element consisting of a lumped constant element.

BACKGROUND ART

There are isolators and circulators known as nonreciprocal circuit elements utilizing Faraday effect of ferrite. The isolators absorb a reflected wave from a load to ensure stable operation of an oscillator, an amplifier and the like, and the circulators transmit a high-frequency signal in one direction with respect to a two-terminal device. The circulators are basic ferrite devices because they can be made into isolators by terminating its one end with a resistor.

There is a circulator known as a 3-port lumped constant circulator which consists of a permanent magnet, ferrite to which a DC magnetic field is applied by the permanent magnet, three center conductors arranged to intersect one another in an electrically insulated state with respect to the ferrite, and matching capacitors electrically connected to the center conductors. Operating frequencies are adjusted with capacity values of capacitors connected in parallel to the three center conductors (see Patent Literature 1, Patent Literature 2).

FIG. 11(*a*) is a block diagram of a 3-port lumped constant circulator, and FIG. 11(*b*) shows an equivalent circuit.

In FIG. 11(*a*), a lumped constant circulator 101 includes ferrite 102 (102*a*, 102*b*), a permanent magnet 104 which applies a DC magnetic field to the ferrite 102, a conductor 103 (103*a* to 103*c*) which is arranged in an electrically insulated state with respect to the ferrite 102, and a capacitor 105 (105*a* to 105*c*) which is connected to the conductor 103 in parallel. The conductor 103 consists of three conductors that are a first conductor 103*a*, a second conductor 103*b* and a third conductor 103*c* intersecting one another at 120-degree intervals and insulated from one another, and the conductors 103*a* to 103*c* have their one ends connected to a first port P1, a second port P2 and a third port P3, respectively, and their other ends terminated and shorted. In addition to that, the capacitors 105*a* to 105*c* are connected in parallel to the inductors 103*a* to 103*c*, respectively, and a parallel-resonant circuit is formed by an inductance of each conductor and a capacitance of each capacitor.

FIG. 11(*b*) shows the equivalent circuit of a parallel-resonant type lumped constant circulator that consists of an ideal circulator 100 and a parallel-resonant circuit 106 (106*a* to 106*c*). The parallel-resonant circuit 106 (106*a* to 106*c*) consists of an inductor Lp (Lp1, Lp2, Lp3) and a lumped constant element of capacitance constant Cp (Cp1, Cp2, Cp3). A frequency characteristic of the lumped constant circulator is defined by the lumped constant elements.

In the 3-port lumped constant circulator, a high-frequency signal input from the first port P1 is output from the third port P3, a high-frequency signal input from the third port P3 is output from the second port P2, and a high-frequency signal input from the second port P2 is output from the first port P1.

Citation List

Patent Literature

[Patent Literature 1] International Publication No. Japanese Patent Laid-Open Publication No. 2011-055222

[Patent Literature 2] International Publication No. WO2016/158044

SUMMARY OF THE INVENTION

Problems to be Solved by the Invention

As items to evaluate the characteristics of a nonreciprocal circuit element, insertion losses of forward power losses and isolation of reverse power losses are known. The insertion losses of the forward power losses are evaluated as transmission characteristics, and the reverse power loss characteristics of a circulator are evaluated by isolation when a termination resistor is connected at one end.

Conventional nonreciprocal circuit elements have a problem that they cannot respond to a variable frequency range of a high-frequency power source because their operating frequency ranges are narrow.

The characteristics of the nonreciprocal circuit elements have frequency characteristics defined by a capacitance value of a matching capacitor in a parallel-resonant circuit, and a bandwidth of a frequency region where an effective frequency characteristic can be obtained is dependent on circuit characteristics of the parallel-resonant circuit. Since the operating frequency range of the nonreciprocal circuit element is narrow and thus a wide operating frequency range cannot be obtained, it is difficult to effectively operate a single parallel-resonant circuit over the entire variable frequency range of the high-frequency power source.

FIG. 12 illustrates narrow-band characteristics of conventional nonreciprocal circuit elements, in which the frequency characteristics of a circulator are shown by transmission characteristics with respect to a frequency. In here, FIG. 12 schematically shows a frequency response diagram and does not show an actual frequency characteristic.

FIG. 12(*a*) shows a state in which a center frequency fc of the frequency characteristics indicating the transmission characteristics of the circulator matches a frequency f of a high-frequency power source. In a case where the center frequency fc of the frequency characteristics of the circulator is set to match the frequency f of the high-frequency power source, the transmission characteristics normally deteriorates when the frequency f of the high-frequency power source deviates from the frequency fc. As shown in FIG. 12(*b*), due to such frequency characteristics, the transmission characteristics at a point fc±Δf where the frequency f of the high-frequency power source deviates from the center frequency fc deteriorates by an insertion loss ΔPs caused by an impedance mismatching between the nonreciprocal circuit elements, compared to the case where the frequency f of the high-frequency power source matches the center frequency fc, so that narrow-band characteristics are shown. Due to the narrow-band characteristics of the frequency characteristics, it is difficult to respond to a variable frequency range of the high-frequency power source because the nonreciprocal circuit elements with good transmission characteristics cannot be expected to have a wide frequency range.

Therefore, an object of the present invention is to broaden frequency characteristics of a nonreciprocal circuit element. Another object of the invention is to broaden the frequency characteristics of the nonreciprocal circuit element by reducing an insertion loss in the nonreciprocal circuit element.

Means for Solving the Problem

A nonreciprocal circuit element of the invention is a circuit element that includes a nonreciprocal unit having nonreciprocal transmission direction characteristics for transmitting signals in a specific direction but not in the opposite direction. The nonreciprocal unit consists of ferrite, an electromagnet that applies a DC magnetic field to the ferrite, and a plurality of conductors that have their terminations being shorted and are arranged to intersect one another in an insulated state with respect to the ferrite.

The nonreciprocal circuit element of the invention includes reciprocal circuit units, each reciprocal circuit unit is connected between an input/output port and the other end of the conductor which is shorted and terminated and has no bias in the transmission direction, and a DC power source control unit that controls a DC current to be supplied to the electromagnet.

(A) Nonreciprocal Unit

A conductor which is connected to an input port of the nonreciprocal unit generates a high-frequency magnetic field by using a high-frequency signal supplied from a high-frequency power source. The high-frequency magnetic field generated by the conductor and a DC magnetic field generated by the electromagnet are added to the ferrite.

The high-frequency magnetic field are a positive circularly polarized magnetic field that rotates clockwise in the direction of the DC magnetic field and a negative circularly polarized magnetic field that rotates counterclockwise.

Regarding an electromagnetic wave that propagates through the ferrite magnetized by the DC magnetic field, there is a difference in the magnitude of magnetic permeability u depending on whether the rotational direction of the two circularly polarized waves and the rotational direction of spin magnetic moment of the ferrite are in the same direction or opposite direction, and thereby the path of a polarization plane of the electromagnetic wave is curved and the traveling direction of the electromagnetic wave changes.

Complex magnetic permeability μ of the ferrite differs between magnetic permeability $\mu_+$ for the positively circularly polarized magnetic field and magnetic permeability $\mu_-$ for the negatively circularly polarized magnetic field, and when the DC magnetic field is applied, the positively circularly polarized magnetic permeability $\mu_+$ decreases while the negatively circularly polarized magnetic permeability $\mu_-$ increases.

(B) DC Power Source Control Unit

The DC power source control unit included in the nonreciprocal circuit element of the invention controls the DC current supplied to the electromagnet to make the intensity of the DC magnetic field applied to the ferrite variable. The intensity of the DC magnetic field is made to be variable so that the difference between the positively circularly polarized magnetic permeability $\mu_+$ and the negatively circularly polarized magnetic permeability $\mu_-$ is changed, thereby making the transmission characteristics variable between terminals in forward and reverse directions.

The characteristics of the magnetic permeability μ (circularly polarized magnetic permeability μ±) with respect to magnetic field intensity H depends on the operating frequency, so that the magnetic field intensity H of the DC magnetic field applied to the ferrite is varied by the electromagnet to thereby enable the control of the center frequency of the frequency characteristics of the nonreciprocal unit to shift to a high frequency side or a low frequency side. In this way, the center frequency of the nonreciprocal unit is matched to the high frequency of the high-frequency signal input to the nonreciprocal circuit element to improve the transmission characteristics of the nonreciprocal circuit element.

As the frequency of the high-frequency signal of the high-frequency power source changes, the center frequency of the nonreciprocal unit is matched to the frequency of the high-frequency signal by controlling the DC current supplied to the electromagnet and varying the intensity of the DC magnetic field generated by the electromagnet. As a result, the frequency characteristics of the nonreciprocal circuit element with respect to the change in the frequency of the high-frequency signal of the high-frequency power source are broadened, and fluctuations in the signal intensity of the high-frequency signal output within a variable frequency range of the frequency in the high-frequency power source are suppressed.

In addition to the above-described effect of broadening the frequency characteristics, the nonreciprocal circuit element of the invention can produce an effect of suppressing thermomagnetic characteristics caused by temperature fluctuations.

In a case of applying the DC magnetic field to the ferrite by a permanent magnet, the temperature fluctuations cause the change in the frequency characteristics of the nonreciprocal circuit element due to the thermomagnetic characteristics of the permanent magnet. By contrast, since the nonreciprocal circuit element of the invention can control the DC current supplied to the electromagnet by the DC power source control unit and make the DC magnetic field generated by the electromagnet variable, the thermomagnetic characteristics caused by temperature fluctuations can be suppressed.

(C) Reciprocal Circuit Unit

The reciprocal circuit unit consists of a parallel-resonant circuit formed of an inductance of the conductor of the nonreciprocal unit and a capacitor connected in parallel. The parallel-resonant circuit has (a) a function as a resonator for defining the frequency characteristics as well as (b) a function as an impedance matching unit for matching an input impedance with a characteristic impedance of an input/output transmission line.

An inductor Lp of the inductance and a constant Cp of a capacitance of the capacitor of the parallel-resonant circuit are determined by nonreciprocal index n and a frequency ω as shown in the following Equations (1) to (3).

[Formula 1]

$$Lp = \sqrt{3}\cdot R\cdot\eta\cdot\{(1/\mu'_+) + (1/\mu'_-)\}/(2\cdot\omega) \quad (1)$$

$$Cp = 1/(\sqrt{3}\cdot\omega\cdot R\cdot\eta) \quad (2)$$

$$\eta = (\mu'_+ - \mu'_-)/(\mu'_+ + \mu'_-) \quad (3)$$

In here, the complex magnetic permeability μ of the ferrite is expressed by μ=μ'−jμ". The real part μ' of the complex magnetic permeability μ indicates a magnetization response, and the imaginary part μ" indicates a magnetic loss. An absolute value |Δμ| of a magnetic permeability difference $$\Delta\mu( = \mu'_- - \mu'_+)$$

between the real part $\mu_+'$ of the positively circularly polarized magnetic permeability $\mu_+$ and the real part $\mu_-'$ of the negatively circularly polarized magnetic permeability $\mu_-$ indicates nonreciprocity.

(Ca: Function of Resonator)

The function of the resonator is to make a resonant frequency of the parallel-resonant circuit variable to thereby make the center frequency of the reciprocal circuit unit variable. Equations (1) and (2) show that the inductor Lp and the constant Cp of the capacitance include the frequency ω as a parameter. It shows that the resonant frequency of the parallel-resonant circuit can be varied by changing the values of the inductor Lp of the inductance and the constant Cp of the capacitance of the capacitor, respectively which form the parallel-resonant circuit.

By changing the values of the inductor Lp and the constant Cp of the capacitance, the center frequency of the reciprocal circuit unit can be matched with the frequency of the high-frequency signal of the high-frequency power source input to the nonreciprocal circuit element. By matching the center frequency of the reciprocal circuit unit with the frequency of the high-frequency signal of the high-frequency power source input to the nonreciprocal circuit element, the transmission characteristics of the nonreciprocal circuit element can be improved.

The nonreciprocal circuit element of the invention primarily varies the center frequency by the nonreciprocal unit, and secondarily varies the center frequency of the reciprocal circuit unit by the function of the resonator. Thus, the variation of the center frequency can be controlled only by the nonreciprocal unit which controls the magnetic field intensity of the DC magnetic field of the electromagnet, or it can be controlled by the function of the resonator of the reciprocal circuit unit in addition to the control by the nonreciprocal unit.

(Cb: Function of Impedance Matching Unit)

The parallel-resonant circuit of the reciprocal circuit unit also serves as an impedance matching unit for matching impedances between each conductor of the nonreciprocal unit and the input/output port side.

The inductor Lp of the parallel-resonant circuit is defined by the inductance of the conductor of the nonreciprocal unit, so that the constant Cp of the capacitance of the capacitor of the parallel-resonant circuit is set based on the frequency of the high-frequency signal of the high-frequency power source to match the impedances.

When the center frequency of the reciprocal circuit unit is matched with the frequency of the high-frequency signal of the high-frequency power source, if the DC magnetic field of the electromagnet is fluctuated in the nonreciprocal unit to change the center frequency, an impedance mismatching may occur in the transmission line system including the reciprocal circuit unit, resulting in occurrence of insertion loss. For such impedance mismatching, the impedances can be matched by the function of the impedance matching unit by the reciprocal circuit unit to reduce the insertion loss due to the impedance mismatching.

(Cc: Constant Varying Unit)

The nonreciprocal circuit element of the invention includes a constant varying unit for varying the capacitance of the capacitor of the reciprocal circuit unit.

The constant varying unit varies the capacitance of the capacitor of the reciprocal circuit unit based on the frequency of the high-frequency signal of the high-frequency power source. The capacitance is varied to change the frequency of the resonant frequency of the parallel-resonant circuit.

The constant varying unit varies the resonant frequency to perform the following functions with respect to the nonreciprocal unit:

(c1) change of the frequency characteristics to match the center frequency to the frequency of the high-frequency signal of the high-frequency power source; and (c2) impedance matching to match the impedance of the input/output port.

The function of changing the main variable frequency characteristics by the nonreciprocal unit is performed by making the center frequency variable by controlling the DC current supplied to the electromagnet.

On the other hand, the function (c1) for changing the frequency characteristics acts as an additional function. When the frequency in the high-frequency power source fluctuates around the center frequency of the nonreciprocal circuit element, or when the frequency in the high-frequency power source fluctuates within the variable frequency range, the DC power source control unit controls the DC magnetic field generated by the electromagnet of the nonreciprocal unit, and the constant varying unit sets the capacitance of the capacitor of the reciprocal circuit unit to optimize the frequency characteristics, thereby broadening the frequency characteristics of the nonreciprocal circuit element.

The function (c2) of the impedances matching prevents the deterioration of the transmission characteristics of the high-frequency signal due to, such as, the change in the frequency characteristics.

(D) Control on DC Current

The control on the DC current supplied to the electromagnet performed by the DC power source control unit includes (Da) a control mode based on a quantity of supplied electricity of the high-frequency signal input to the nonreciprocal unit, or (Db) a control mode based on the frequency of the high-frequency signal supplied to the nonreciprocal unit.

(Da: Control Based on Quantity of Supplied Electricity)

The DC power source control unit controls a current value of the DC current based on the quantity of supplied electricity of the high-frequency signal input to the nonreciprocal unit from the high-frequency power source, so as to vary the intensity of the DC magnetic field. It can match the center frequency of the frequency characteristics of the nonreciprocal unit with the frequency of the high-frequency signal of the high-frequency power source.

Between the high-frequency power source and the reciprocal circuit unit connected to the input port, a power supply detection unit is provided to detect the quantity of supplied electricity. The quantity of supplied electricity can be any one of voltage, current, electric power and reflectance. If there is a deviation between the center frequency of the frequency characteristics of the nonreciprocal unit and the frequency of the high-frequency signal of the high-frequency power source, an insertion loss will occur, resulting in a decrease in the quantity of supplied electricity, such as voltage, current, electric power and reflectance.

The power supply detection unit detects the quantity of supplied electricity and feeds back the detected value of the quantity of supplied electricity to the DC power source control unit. The DC power source control unit compares the quantity of supplied electricity fed back from the power supply detection unit with a set value to thereby control the current value of the DC current supplied to the electromagnet so that the quantity of supplied electricity becomes the set value. The set value can be a set voltage value, a set current value, a set power value and a set reflectance. These set values are set based on their respective values when there is no insertion loss.

(db: Control Based on Frequency)

The DC power source control unit controls the value of the DC current based on the frequency of the high-frequency signal input from the high-frequency power source to the nonreciprocal unit to vary the intensity of the DC magnetic field. Thus, the center frequency of the frequency characteristics of the nonreciprocal unit is matched with the frequency of the high-frequency signal of the high-frequency power source.

The frequency characteristics of the nonreciprocal unit fluctuate depending on the frequency of the high-frequency signal input to the high-frequency power source. Thus, by controlling the value of the DC current according to the frequency of the high-frequency signal and varying the intensity of the DC magnetic field, the center frequency of the frequency characteristics of the nonreciprocal unit can be matched with the frequency of the high-frequency signal of the high-frequency power source even when the frequency of the high-frequency signal is changed.

The control based on the frequency of the high-frequency signal of the high-frequency power source can include (d1) a control mode performed based on a detected frequency obtained by detecting the frequency of the high-frequency signal input from the high-frequency power source to the nonreciprocal unit, or (d2) a control mode performed based on a control frequency for controlling the frequency in the high-frequency power source.

(d1) Control Mode Based on Detected Frequency

This control mode detects the frequency of the high-frequency signal input from the high-frequency power source to the nonreciprocal unit to control the DC current supplied to the electromagnet based on the detected frequency thus obtained. The control mode has a frequency detection unit between the high-frequency power source and the reciprocal circuit unit connected to the input port for detecting the frequency of the high-frequency signal. The DC power source control unit controls the DC current based on the frequency detected by the frequency detection unit.

(d2) Control Mode Based on Control Frequency

This control mode controls the DC current supplied to the electromagnet based on a control frequency for controlling the frequency in the high-frequency power source. The control mode has a frequency control unit for controlling the frequency in the high-frequency power source. The DC power source control unit controls the DC current based on the control frequency in the frequency control unit.

(E) Multiple-Unit Configuration

The nonreciprocal circuit element of the invention includes multiple units, each unit includes the nonreciprocal unit, the reciprocal circuit unit, and the DC power source control unit.

The nonreciprocal unit of each unit has a frequency characteristic having a different center frequency, so that each unit outputs a high-frequency signal in a different frequency band.

The center frequency of the frequency characteristics of each unit is set to be shifted within the frequency band of the high-frequency power source, and a high-frequency signal in the frequency band thus set for each unit is output from each unit according to the change in the high frequency in the high-frequency power source. The frequency bands set for the multiple units are shifted in order and combined, so that the frequency characteristics of the nonreciprocal circuit element can be broadened.

(F: Output Port Switchover)

The nonreciprocal circuit element of the invention selects an output port by switching between a plurality of ports and outputs the high-frequency signal from the selected output port.

The nonreciprocal circuit element of the invention can switch the plurality of output ports in two modes (f1) and (f2).

(f1) First Mode of Output Port Switchover

According to the output port switchover of the first mode, the DC power source control unit changes the current direction of the DC current supplied to the electromagnet. By changing the current direction of the DC current, the direction of the DC magnetic field generated by the electromagnet is changed. The change in the direction of the DC magnetic field causes the change in the traveling direction of an electromagnetic wave in the ferrite in the nonreciprocal unit, thereby switching the output port for outputting the high-frequency signal.

(f2) Second Mode of Output Port Switchover

According to the output port switchover of the second mode, the DC power source control unit changes the current direction of the DC current and varies the current value. This makes it possible to implement the output port switchover and the frequency characteristics change at the same time.

For example, the first mode is employed as an output mode for outputting a high-frequency signal by using a port P2 as a first output port and the second mode is employed as another output mode for outputting the high-frequency signal by using a port P3 as a second output port. When the output ports are switched between the two output modes of the first mode and the second mode, the switchover in the first mode allows the first output port to output a high-frequency signal at a frequency f1, and the switchover in the second mode allows the second output port to output a high-frequency signal at a frequency f2. Contrary to this case, the frequencies of the high-frequency signals output from the output ports may be interchanged such that the first output port outputs the high-frequency signal at the frequency f2 in the first mode switchover and the second output port outputs the high-frequency signal at the frequency f1 in the second mode switchover.

Effect of the Invention

As described above, according to the present invention, the frequency characteristics of the nonreciprocal circuit element can be broadened. In addition to that, the frequency characteristics of the nonreciprocal circuit element can be broadened by reducing the insertion loss in the nonreciprocal circuit element.

BEST MODE FOR CARRYING OUT THE INVENTION

In the following, a schematic configuration of a nonreciprocal circuit element of the present invention will be described by referring to FIGS. 1 and 2, and Configuration Examples 1 to 7 of the nonreciprocal circuit element of the invention will be described by referring to FIGS. 3 to 10.

Configuration Examples 1 to 4 show control on frequency characteristics of a nonreciprocal unit.

Figure 3:
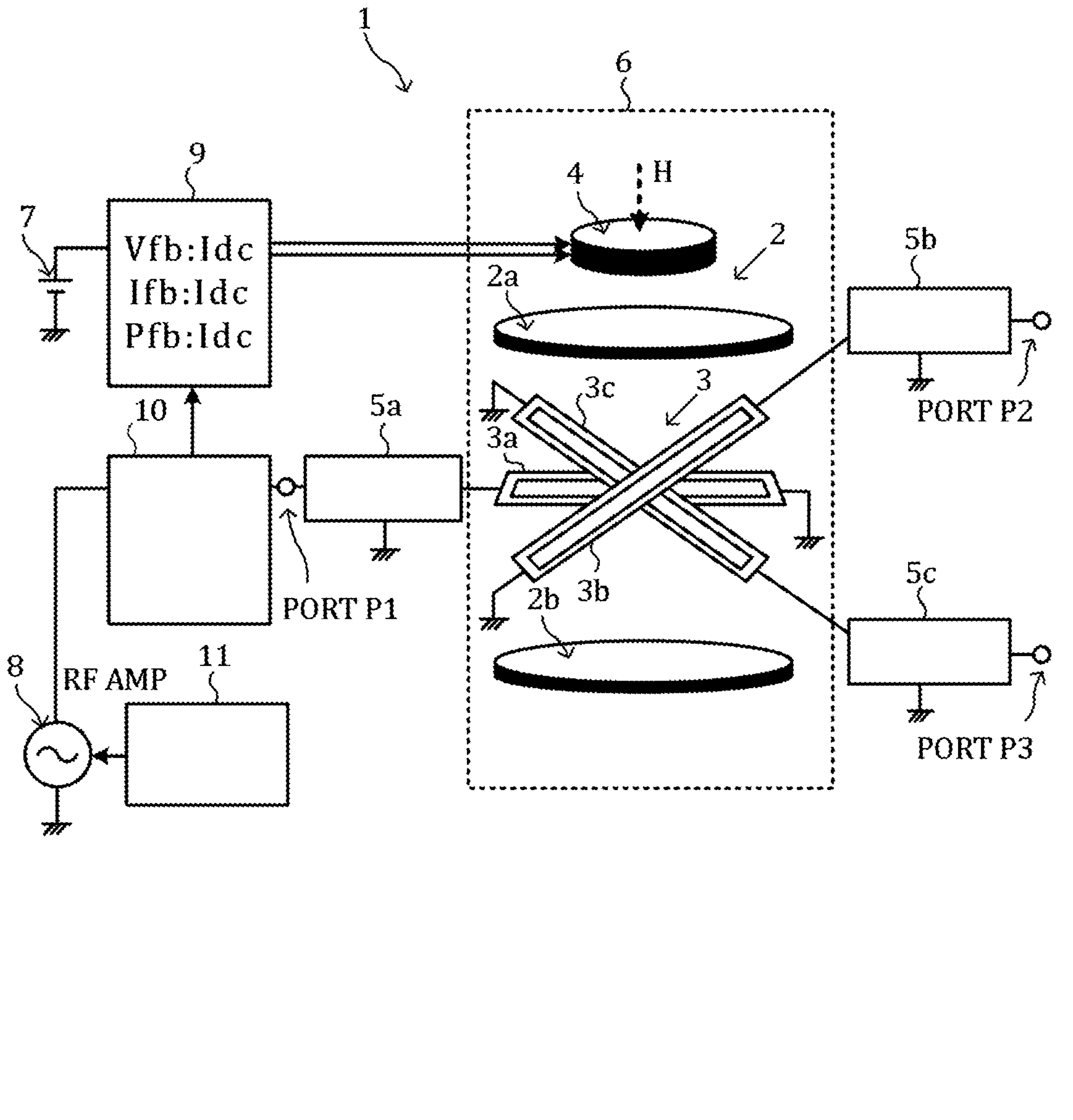
FIG. 3 is a schematic block diagram illustrating Configuration Example 1 of the nonreciprocal circuit element according to the present invention.
Figure 4:
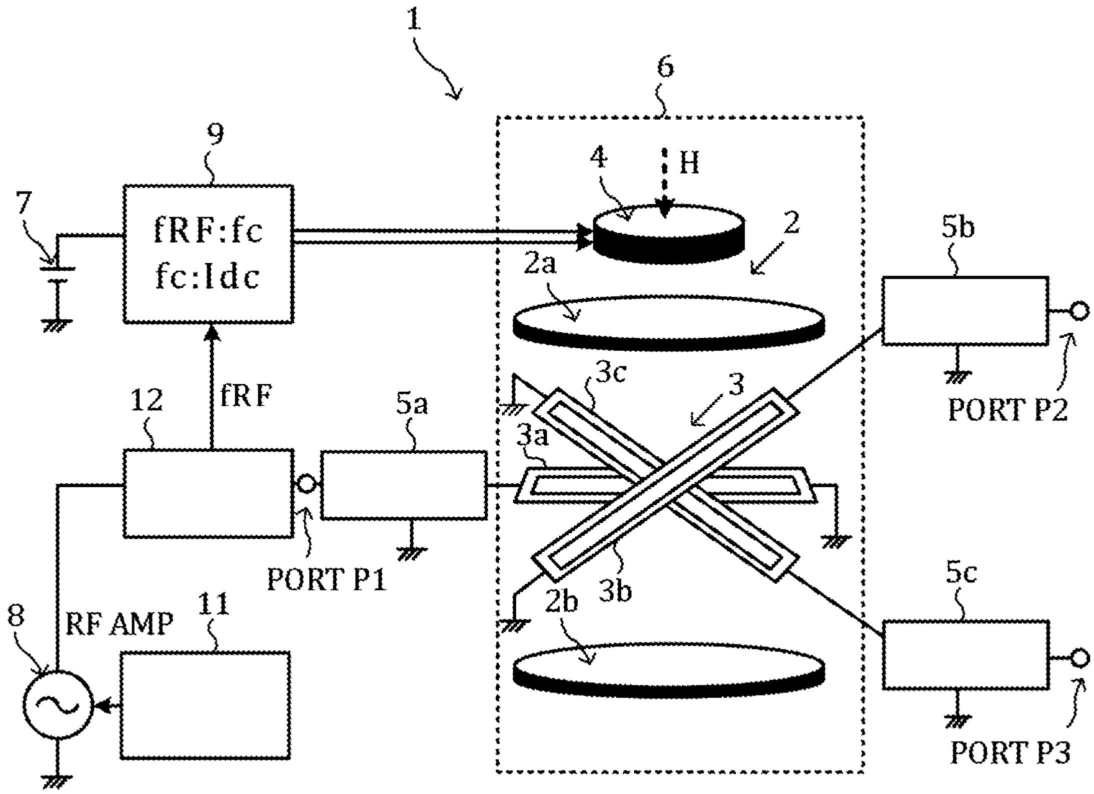
FIG. 4 is a schematic block diagram illustrating Configuration Example 2 of the nonreciprocal circuit element according to the present invention.
Figure 5:
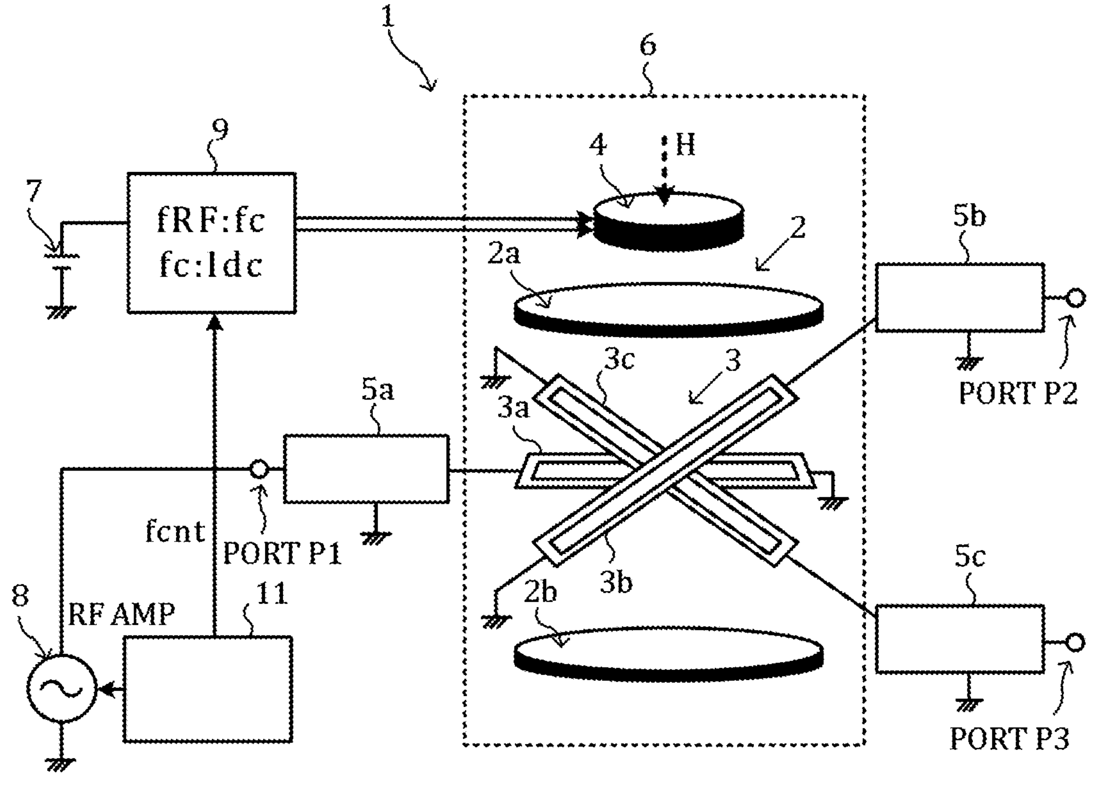
FIG. 5 is a schematic block diagram illustrating Configuration Example 3 of the nonreciprocal circuit element according to the present invention.
Figure 6:
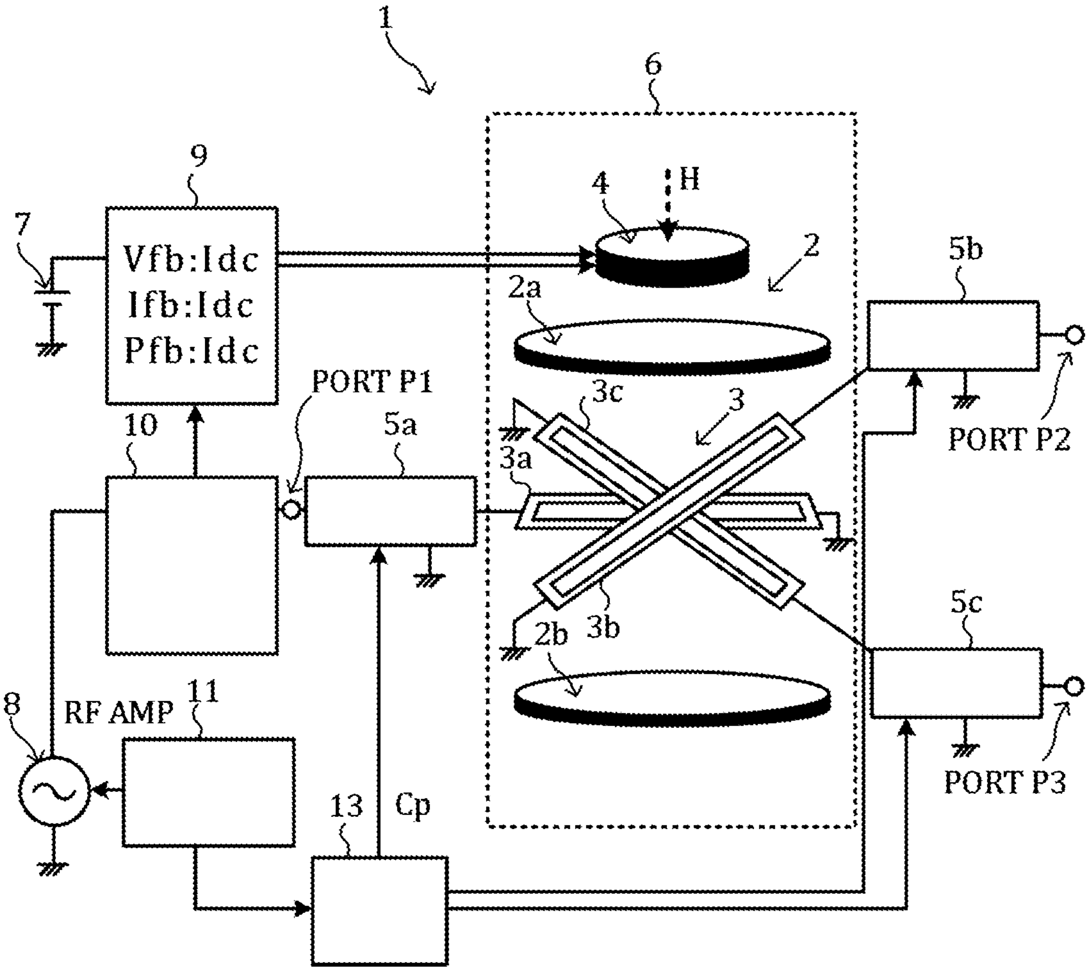
FIG. 6 is a schematic block diagram illustrating Configuration Example 4 of the nonreciprocal circuit element according to the present invention.

Configuration Example 1 in FIG. 3 shows control on a DC current based on a quantity of supplied electricity of a high-frequency signal input from a high-frequency power source to the nonreciprocal unit, Configuration Example 2 and Configuration Example 3 in FIGS. 4 and 5, respectively, show the control on the DC current based on a frequency of the high-frequency signal input from the high-frequency power source to the nonreciprocal unit, and Configuration Example 4 in FIG. 6 shows a change in a constant of a reciprocal circuit unit based on the frequency of the high-frequency signal input from the high-frequency power source to the nonreciprocal unit.

Configuration Examples 5 to 7 show how to use the nonreciprocal circuit element of the invention.

Figure 7:
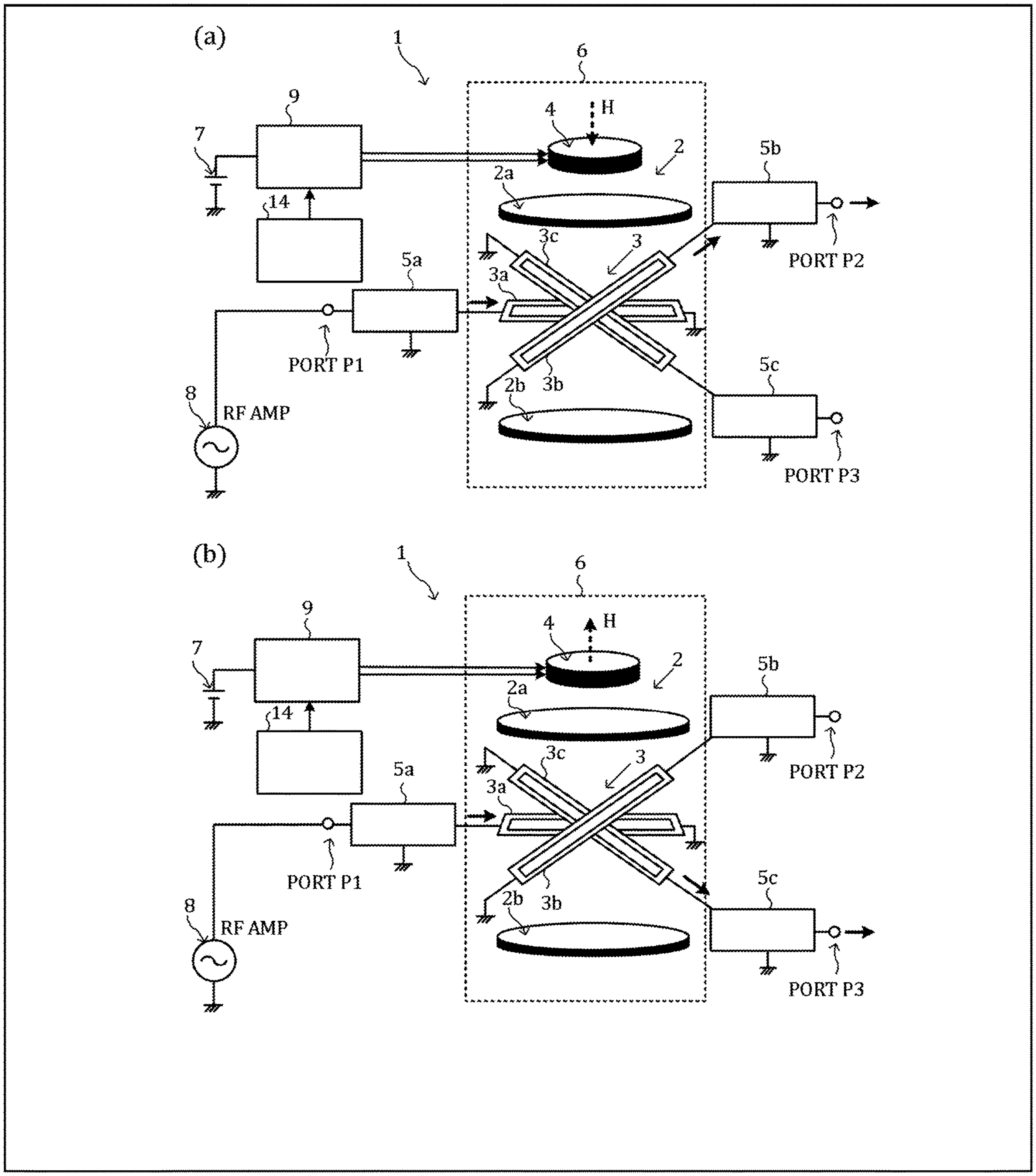
FIG. 7(*a*) and FIG. 7(*b*) are schematic block diagrams illustrating Configuration Example 5 of the nonreciprocal circuit element according to the present invention.
Figure 8:
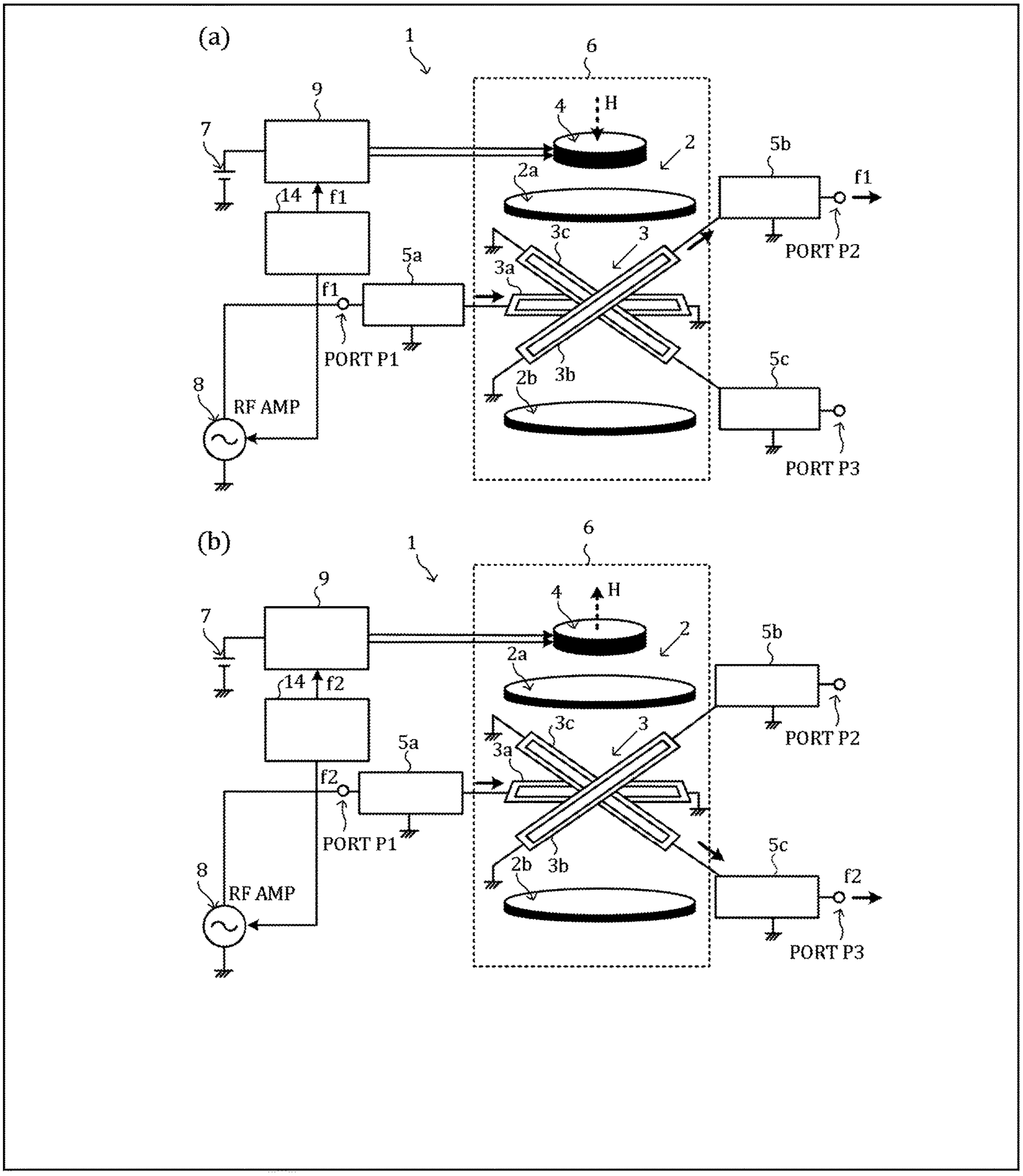
FIG. 8(*a*) and FIG. 8(*b*) are schematic block diagrams illustrating Configuration Example 6 of the nonreciprocal circuit element according to the present invention.
Figure 9:
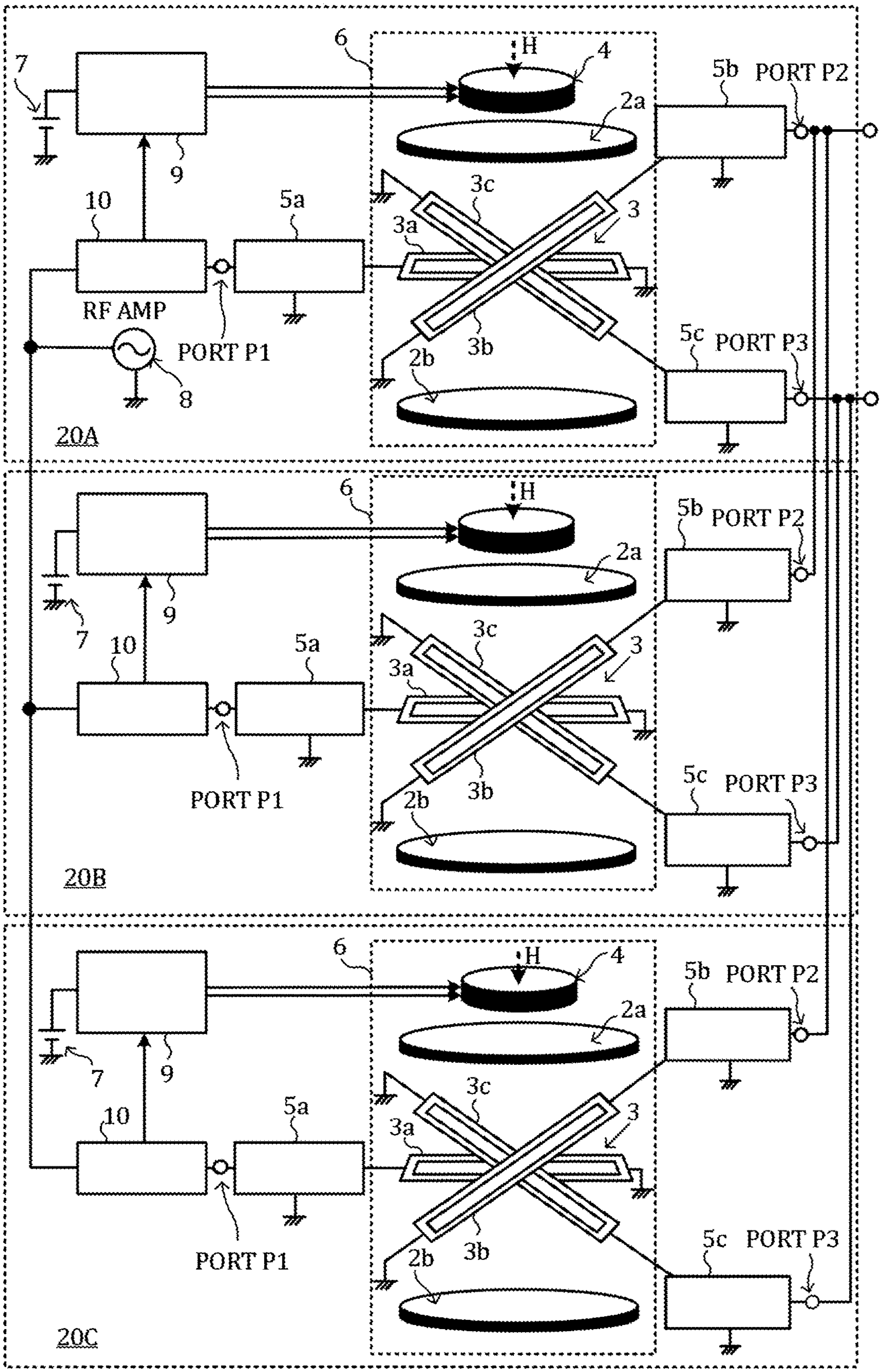
FIG. 9 is a schematic block diagram illustrating Configuration Example 7 of the nonreciprocal circuit element according to the present invention.
Figure 10:
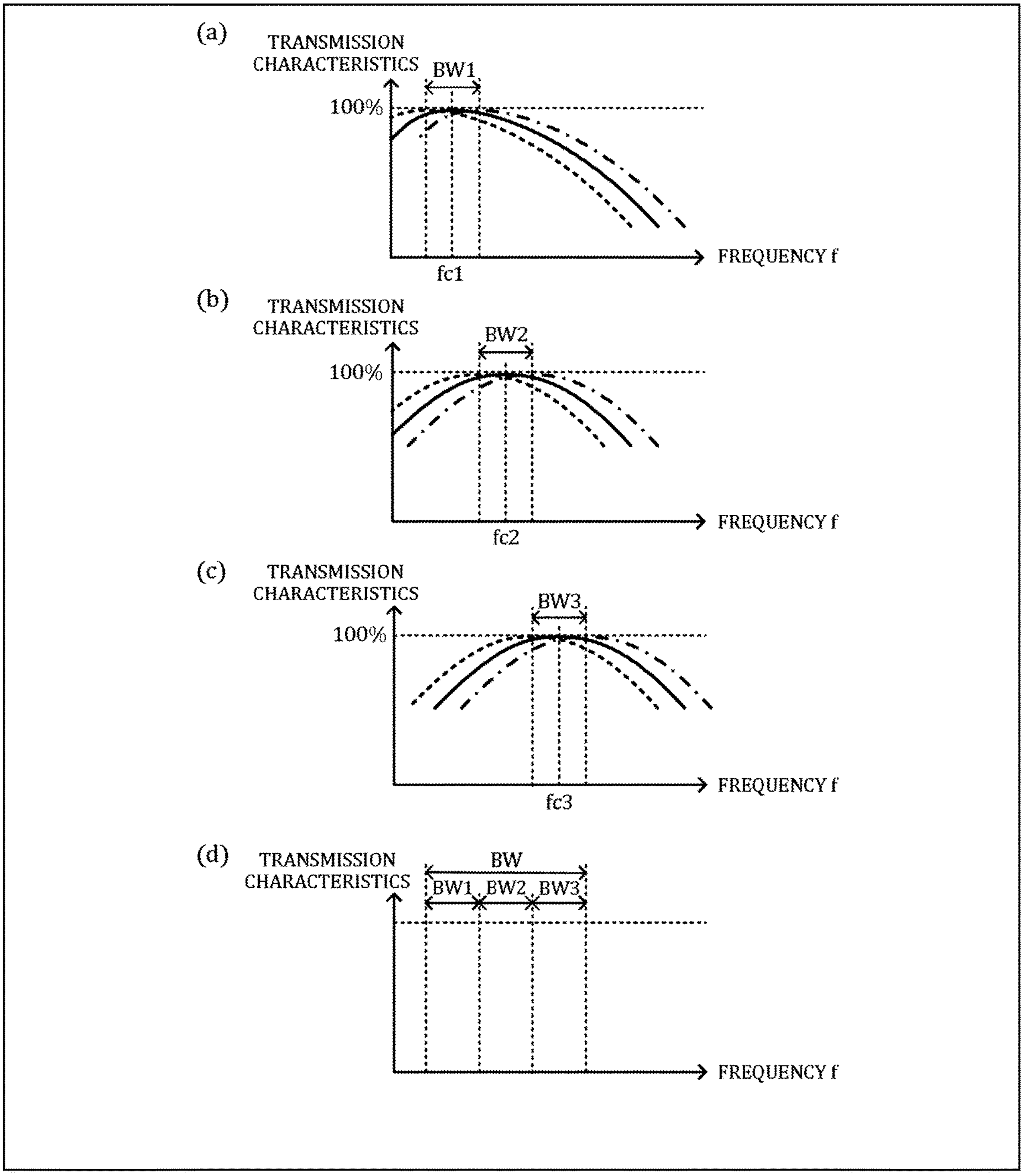
FIGS. 10(*a*)-10(*d*) are schematic block diagrams illustrating frequency characteristics in Configuration Example 7 of the nonreciprocal circuit element according to the present invention.
Figure 11:
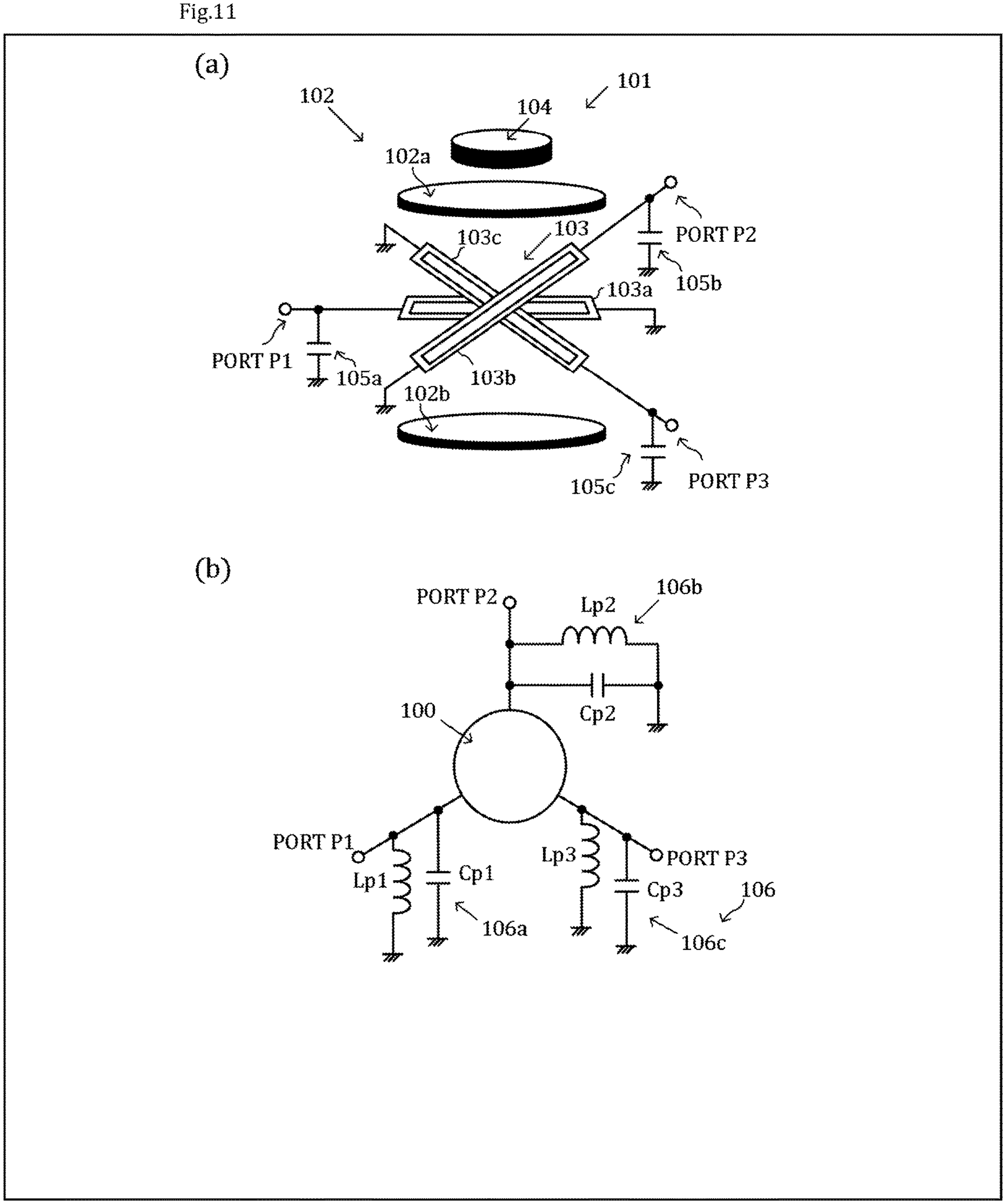
FIG. 11(*a*) and FIG. 11(*b*) show block diagrams of a 3-port lumped constant circulator and an equivalent circuit.
Figure 12:
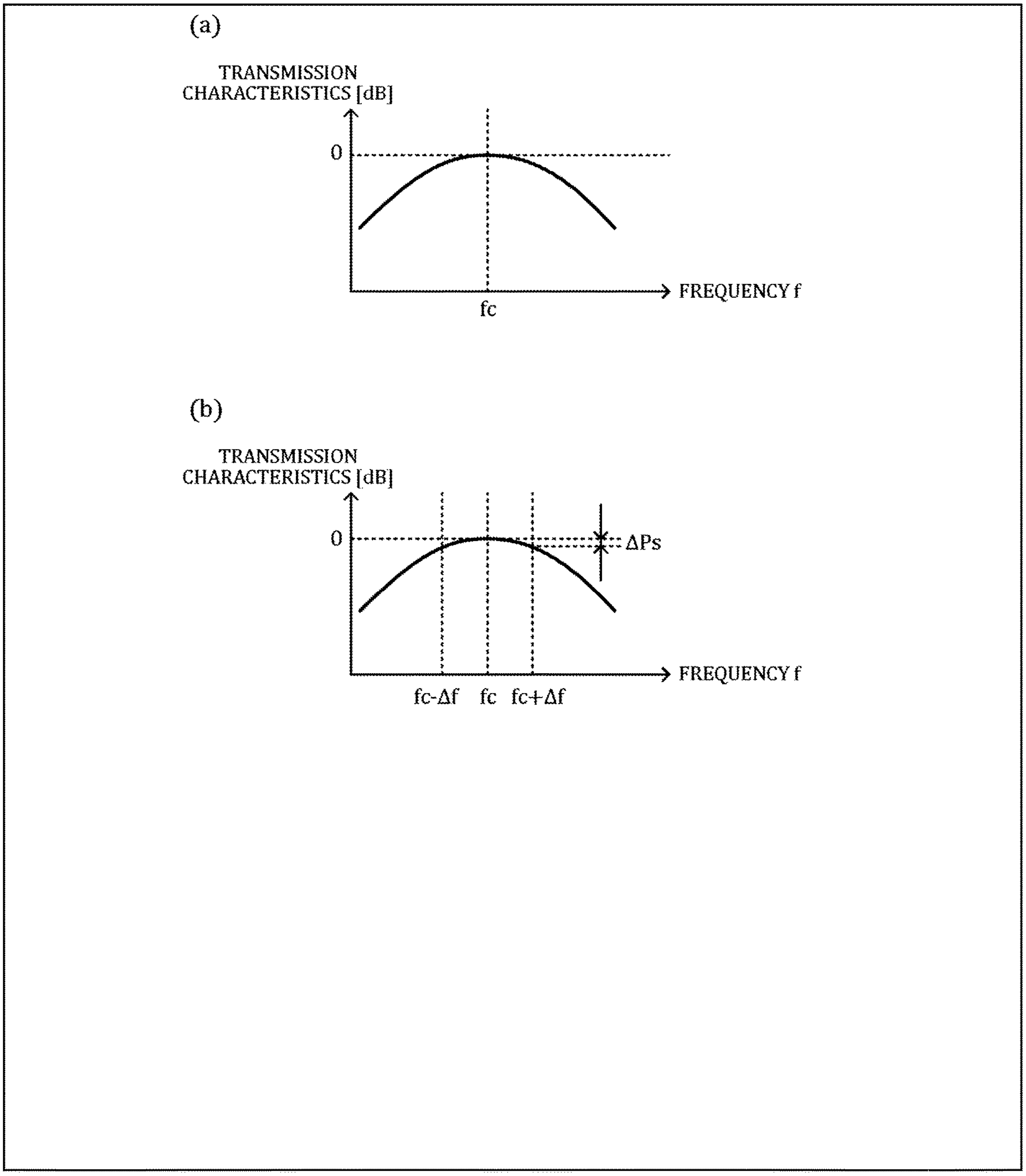
FIG. 12(*a*) and FIG. 12(*b*) illustrate narrow-band characteristics of a conventional nonreciprocal circuit element.

Configuration Example 5 in FIG. 7 shows an example that output ports are switched by switching the direction of the DC current supplied to an electromagnet, Configuration Example 6 in FIG. 8 shows an example that the output ports are switched while changing the frequency of the high-frequency signal to be output, and Configuration Example 7 in FIGS. 9 and 10 shows an example that multiple units having different frequency characteristics are provided.

Schematic Configuration of the Invention

The schematic configuration of the nonreciprocal circuit element of the invention will be described based on FIGS. 1 and 2.

Figure 1:
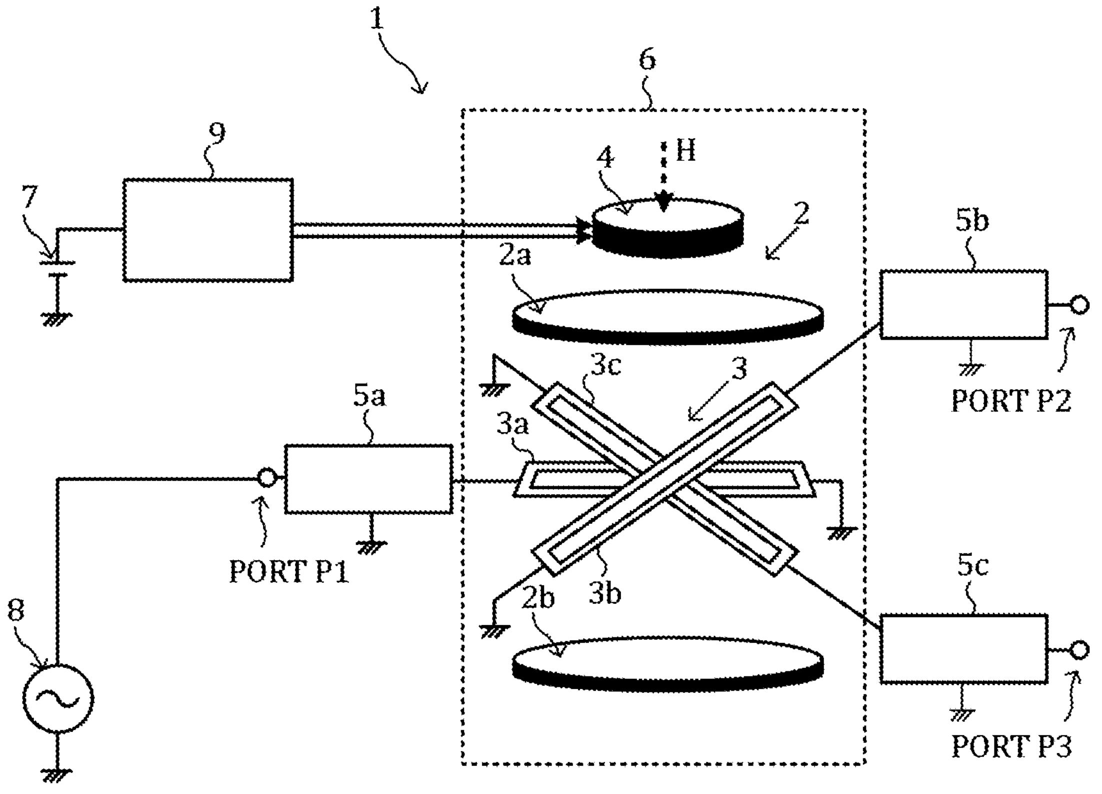
FIG. 1 illustrates a schematic configuration of a nonreciprocal circuit element according to the present invention.

FIG. 1 shows an example of providing a 3-port lumped constant circulator serving as a nonreciprocal circuit element 1 in which a high-frequency signal input to a port P1 from a high-frequency power source 8 is output to a port P2 or port P3. In FIG. 1, the nonreciprocal circuit element 1 includes a nonreciprocal unit 6 that has characteristics of transmitting a signal only in a specified direction but not in the opposite direction.

The nonreciprocal unit 6 includes ferrite 2, an electromagnet 4 that applies a DC magnetic field to the ferrite 2, and a conductor 3. In the 3-port lumped constant circulator, the conductor 3 consists of three conductors 3*a*, 3*b* and 3*c* which are arranged to intersect one another in an insulated state with respect to the ferrite 2, and one end of each conductor is connected on an input/output port side and the other end is connected to ground.

On both sides of the conductor 3, ferrite 2*a* and ferrite 2*b* are disposed. The ferrite 2 can be disposed on one side of the conductor 3, instead of disposing on both sides of the conductor 3.

The electromagnet 4 generates a DC magnetic field using a DC current supplied from a DC power source 7 and then applies the DC magnetic field to the ferrite 2.

Between the DC power source 7 and the electromagnet 4, a DC power source control unit 9 is provided. The DC power source control unit 9 controls a DC current Idc supplied from the DC power source 7 to the electromagnet 4 to thereby control the intensity of the DC magnetic field generated around the electromagnet 4.

The terminals on the opposite side to each shorted terminal of each conductor 3 (3*a*, 3*b*, 3*c*) of the nonreciprocal unit 6 are connected to the ports P1 to P3 through the reciprocal circuit 5*a*, 5*b*, 5*c*, respectively. The high-frequency power source 8 is connected to the port 1, and a high-frequency signal of the high-frequency power source 8 is supplied through the reciprocal circuit unit 5*a* to the conductor 3*a* to thereby generate a high-frequency magnetic field.

The high-frequency magnetic field generated around the conductor 3*a* and the DC magnetic field generated around the electromagnet 4 are applied to the ferrite 2 (2*a*, 2*b*). The high-frequency magnetic field includes a positively circularly polarized magnetic field that rotates clockwise and a negatively circularly polarized magnetic field that rotates counterclockwise in the direction of the DC magnetic field. The intensity of the DC magnetic field is controlled to control a magnetic permeability of a positively circularly polarized wave, thereby setting the traveling direction of an electromagnetic wave at a predetermined angle. Magnetic permeability μ of the ferrite changes according to a frequency f of the high-frequency signal and magnetic field intensity Hdc of the DC magnetic field, so that the frequency characteristics of the nonreciprocal unit 6 shifts according to the magnetic field intensity Hdc of the DC magnetic field.

Figure 2:
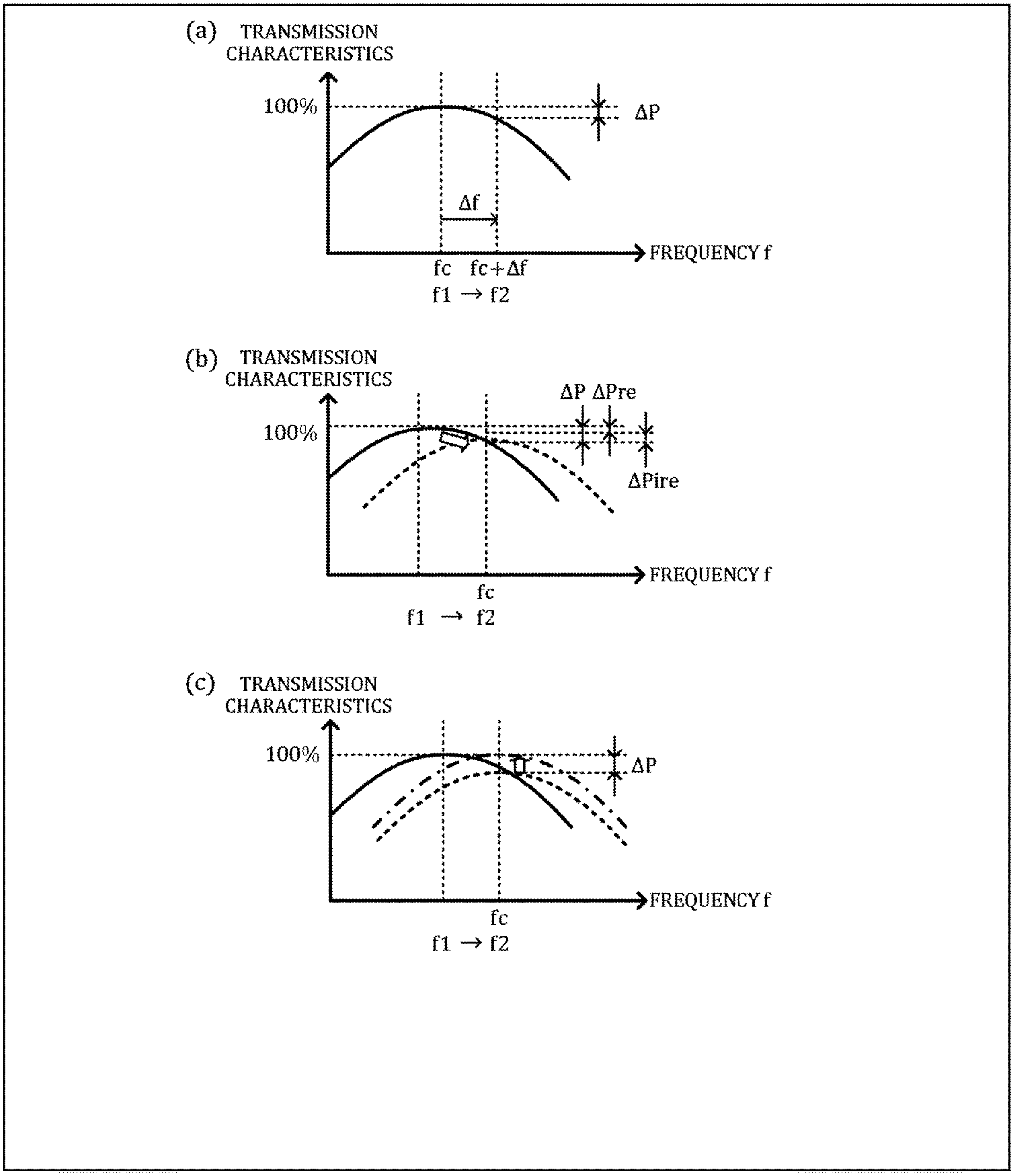
FIGS. 2(*a*)-2(*c*) illustrate frequency characteristics of the nonreciprocal circuit element according to the present invention.

The frequency characteristics shown in FIG. 2(*a*) schematically indicates transmission characteristics when the high-frequency signal passes the reciprocal circuit unit 5 and the nonreciprocal unit 6. FIG. 2(*a*) shows a center frequency fc of the frequency characteristics when the magnetic field intensity Hdc of the DC magnetic field is a predetermined value. In this case, a frequency f1 of the high-frequency signal matches the center frequency fc, and thus the transmission characteristics is good. When the frequency f of the high-frequency signal in the above state shifts from the center frequency fc by Δf and changes from f1 to f2 (=fc+Δf), impedance mismatchings occur in the reciprocal circuit unit 5 and the nonreciprocal unit 6. These impedance mismatchings cause an insertion loss ΔP, resulting in a decrease in strength of the high-frequency signal output from the nonreciprocal unit 6. The frequency characteristics shown in FIG. 2(*b*) schematically indicates the transmission characteristics when the frequency f of the high-frequency signal drifts from the center frequency fc.

When an insertion loss caused by an impedance mismatching in the reciprocal circuit unit 5 is indicated with ΔPre and an insertion loss caused by an impedance mismatching in the nonreciprocal unit 6 is indicated with ΔPire, the total insertion loss ΔP of the reciprocal circuit unit 5 and the nonreciprocal unit 6 is expressed as ΔP=ΔPre+ΔPire which is a sum of the insertion loss ΔPre of the reciprocal circuit unit 5 and the insertion loss ΔPire of the nonreciprocal unit 6.

In FIG. 2(*b*), a solid line indicates frequency characteristics before the frequency f of the high-frequency signal drifts, and a broken line indicates frequency characteristics after the frequency f of the high-frequency signal drifts. In here, the center frequency fc represents the center frequency of the frequency characteristics after the frequency f of the high-frequency signal drifts. In the frequency characteristics after the frequency f of the high-frequency signal drifts, the insertion loss ΔP occurs in the center frequency fc due to the impedance mismatching caused by the drift of the frequency f, leading to the decrease in the high-frequency signal output. The insertion loss ΔP is the total of the insertion loss ΔPre of the reciprocal circuit unit 5 and the insertion loss ΔPire of the nonreciprocal unit 6. Note that, it is assumed that there is no internal loss in the nonreciprocal circuit element 1.

The insertion loss ΔPire of the nonreciprocal unit 6 can be compensated by the impedance matching performed by matching the center frequency fc of the frequency characteristics of the nonreciprocal unit 6 with the frequency f2 of the high-frequency signal. In addition to that, the insertion loss ΔPre of the reciprocal circuit unit 5 can be compensated by the impedance matching performed by varying a constant of the capacitance of the reciprocal circuit unit 5.

The frequency characteristics in FIG. 2(*c*) show a state that the frequency characteristics of the nonreciprocal unit 6 and the capacitance of the reciprocal circuit unit 5 are adjusted to thereby prevent the insertion loss ΔP due to the impedance mismatching. The prevention of the insertion loss ΔP is achieved in such a way that during the shift of the frequency characteristics, the impedance matching of the nonreciprocal unit 6 is conducted by matching the center frequency fc of the frequency characteristics of the nonreciprocal unit 6 with the frequency f2 of the high-frequency signal, varying the constant of the capacitance of the reciprocal circuit unit 5, and thereby performing the impedance matching of the reciprocal circuit unit 5.

The DC power source control unit 9 controls the DC current supplied to the electromagnet 4 so as to vary the magnetic field intensity Hdc of the DC magnetic field applied to the ferrite 2, thereby controlling the frequency characteristics of the nonreciprocal unit 6.

When the frequency of the high-frequency signal of the high-frequency power source 8 is varied within a variable frequency range, the magnetic field intensity Hdc of the DC magnetic field is controlled to control the frequency characteristics of the nonreciprocal unit 6, so that the intensity of the high-frequency signal output from the nonreciprocal circuit element 1 can be made uniform.

In a case where the frequency of the high-frequency power source 8 fluctuates around a predetermined frequency, the magnetic field intensity Hdc of the DC magnetic field is controlled to control the frequency characteristics of the nonreciprocal unit 6, thereby preventing the intensity fluctuation of the high-frequency signal output from the nonreciprocal circuit element 1.

Now, Configuration Examples 1 to 7 of the present invention will be described. It is assumed that there is no internal loss in the nonreciprocal circuit element 1 in Configuration Examples 1 to 7.

Configuration Example 1

Configuration Example 1 of the nonreciprocal circuit element of the invention will be described by referring to FIG. 3.

Configuration Example 1 is an example that the control of the DC current is executed by the DC power source control unit 9 based on the quantity of supplied electricity which is supplied from the high-frequency power source 8 to the nonreciprocal unit 6. Configuration Example 1 includes a power supply detection unit 10 arranged between the high-frequency power source 8 and a reciprocal circuit unit 5*a* in the schematic configuration shown in FIG. 1. The power supply detection unit 10 is configured to detect the quantity of supplied electricity supplied from the high-frequency power source 8 to the nonreciprocal unit 6.

The insertion losses in the reciprocal circuit unit 5 and the nonreciprocal unit 6 due to the impedance mismatching causes the decrease in the voltage, the current and the power, and thus the reflectance increases. The power supply detection unit 10 detects the fluctuation of the voltage, the current, the power or the reflectance caused by the insertion losses in the reciprocal circuit unit 5 and the nonreciprocal unit 6 due to the impedance mismatching as the quantity of supplied electricity, and feeds back the detection result to the DC power source control unit 9. Configuration Example 1 detects the quantity of supplied electricity to detect the amount of change due to a reverse power loss or a forward power loss, thereby feeding back the detected amount of change to the DC power source control unit 9.

The DC power source control unit 9 controls the DC current supplied from the DC power source 7 to the electromagnet 4 based on the quantity of supplied electricity fed back, and controls the DC magnetic field generated by the electromagnet 4 to thereby control the frequency characteristics of the nonreciprocal unit 6. The DC power source control unit 9 compares the detected quantity of supplied electricity with a reference value, and conducts the control such that a difference acquired by the comparison is small. As the reference value, for example, a quantity of supplied electricity can be used when the reverse power loss or forward power loss is a predetermined value.

In Configuration Example 1, the frequency control unit 11 may be used to vary a frequency fRF of the high-frequency signal output from the high-frequency power source 8. The frequency control unit 11 controls the frequency fRF of the high-frequency signal output from the high-frequency power source 8 within the variable frequency range.

Configuration Example 2

Configuration Example 2 of the nonreciprocal circuit element of the present invention will be described by referring to FIG. 4.

Configuration Example 2 is an example that the control of the DC current is executed by the DC power source control unit 9 based on the frequency fRF of the high-frequency signal input from the high-frequency power source 8 to the nonreciprocal unit 6.

Configuration Example 2 includes a frequency detection unit 12 that detects the frequency of the high-frequency signal. The frequency detection unit 12 transmits the detected frequency fRF of the high-frequency signal to the DC power source control unit 9. The DC power source control unit 9 controls the DC current supplied from the DC power source 7 to the electromagnet 4 based on the transmitted frequency fRF of the high-frequency signal, so as to control the DC magnetic field generated by the electromagnet 4.

The DC power source control unit 9 predefines the relationship between the center frequency fc and the DC current Idc within the variable frequency range. The DC power source control unit 9 uses the detected frequency fRF of the high-frequency signal as the center frequency fc of the frequency characteristics of the nonreciprocal unit 6, determines the DC current Idc from the center frequency fc corresponding to the detected frequency fRF of the high-frequency signal based on the predefined relationship between the center frequency fc and the DC current Idc, and supplies the DC current Idc to the electromagnet 4 to control the DC magnetic field, thereby controlling the frequency characteristics of the nonreciprocal unit 6.

In Configuration Example 2, as with Configuration Example 1, the frequency control unit 11 may be configured to vary the frequency fRF of the high-frequency signal output from the high-frequency power source 8. The frequency control unit 11 controls the frequency fRF of the high-frequency signal output from the high-frequency power source 8 within the variable frequency range.

Configuration Example 3

Configuration Example 3 of the nonreciprocal circuit element of the present invention will be described based on FIG. 5.

Configuration Example 3 is an example that the control of the DC current is executed by the DC power source control unit 9 based on the frequency fRF of the high-frequency signal input from the high-frequency power source 8 to the nonreciprocal unit 6, as with Configuration Example 2. Configuration Example 2 acquires the frequency fRF of the high-frequency signal from the detection signal detected by the frequency detection unit 12, whereas Configuration Example 3 acquires the frequency fRF of the high-frequency signal from the frequency control unit 11 which controls the frequency fRF of the high-frequency signal output from the high-frequency power source 8.

Configuration Example 3 includes the frequency control unit 11, the frequency control unit 11 controlling the frequency fRF of the high-frequency signal output from the high-frequency power source 8. The frequency control unit 11 transmits the frequency fRF of the high-frequency signal to the DC power source control unit 9. The DC power source control unit 9 controls the DC current supplied from the DC power source 7 to the electromagnet 4 based on the transmitted frequency fRF of the high-frequency signal to control the DC magnetic field generated by the electromagnet 4, thereby controlling the frequency characteristics of the nonreciprocal unit 6.

The DC power source control unit 9 predefines, as with Configuration Example 2, the relationship between the center frequency fc and the DC current Idc within the variable frequency range. The DC power source control unit 9 uses the detected frequency fRF of the high-frequency signal as the center frequency fc of the frequency characteristics of the nonreciprocal unit 6, determines the DC current Idc from the center frequency fc corresponding to the detected frequency fRF of the high-frequency signal based on the predefined relationship between the center frequency fc and the DC current Idc, and supplies the determined DC current Idc to the electromagnet 4 to thereby generate the DC magnetic field.

Configuration Example 4

Configuration Example 4 of the nonreciprocal circuit element of the present invention will be described based on FIG. 6.

Configuration Example 4 includes, as with Configuration Example 1, a control system that feeds back the quantity of supplied electricity detected by the power supply detection unit 10 to the DC power source control unit 9 to control a DC current, and controls the DC magnetic field generated by the electromagnet 4 based on the DC current Idc obtained by controlling the DC current, so as to control the frequency characteristics of the nonreciprocal unit 6.

In addition to the control system for controlling the frequency characteristics of the nonreciprocal unit 6 by controlling the DC current by the DC power source control unit 9, Configuration Example 4 includes another control system that controls the frequency characteristics of the nonreciprocal unit 6 by varying a constant of the capacitance of the capacitor included in the reciprocal circuit unit 5*a*.

Configuration Example 4 includes a constant variation unit 13, the constant variation unit 13 varying the constant Cp of the capacitance of the capacitor included in the reciprocal circuit unit 5*a*. The constant variation unit 13 acquires the frequency fRF of the high-frequency signal from the frequency control unit 11, determines the constant Cp of the capacitance based on the relationship expressed by Formula (2), and varies the constant of the capacitance of the reciprocal circuit unit 5*a* based on the determined constant Cp. Consequently, the reciprocal circuit unit 5*a* can match the center frequency fc of the frequency characteristics of the nonreciprocal unit 6 with the frequency fRF of the high-frequency signal of the high-frequency power source 8.

Configuration Example 5

Configuration Example 5 of the nonreciprocal circuit element of the present invention will be described based on FIG. 7.

Configuration Example 5 is an example that switches the output ports of the nonreciprocal unit 6. Although the switching of the output ports can be performed in any of Configuration Examples 1 to 4, the following description takes Configuration Example 1 as an example.

The output ports of the nonreciprocal unit 6 are switched by changing the direction of the DC magnetic field generated by changing the direction of the DC current Idc supplied to the electromagnet 4. The direction of the DC current Idc is changed by controlling the DC power source control unit 9 by a control unit 14. FIG. 7(*a*) shows that the port P2 is switched to the output port, and FIG. 7(*b*) shows that the port P3 is switched to the output port.

Configuration Example 6

Configuration Example 6 of the nonreciprocal circuit element of the present invention will be described based on FIG. 8.

Configuration Example 6 is an example that switches the output ports of the nonreciprocal unit 6 as with Configuration Example 5, and changes the frequency of the high-frequency signal output from the output port at the same time as the switching.

The switching of the output ports of the nonreciprocal unit 6 and the change of the frequency are performed by changing the direction of the DC current Idc supplied to the electromagnet 4 concurrently with the change of the frequency of the high-frequency signal output from the high-frequency power source 8.

Configuration Example 6 includes the control unit 14, and the control unit 14 performs current direction control for changing the direction of the DC current Idc and frequency control for changing the frequency of the high-frequency signal output from the high-frequency power source 8.

The control unit 14 controls the DC power source control unit 9 to change the direction of the DC current Idc, thereby reversing the direction of the DC magnetic field generated due to the change in the current direction. In addition to that, the control unit 14 controls the high-frequency power source 8 to change the frequency of the high-frequency signal.

FIG. 8(*a*) shows that the port P2 is switched to the output port to thereby output the high-frequency signal at the frequency f1 from the port P2, and FIG. 8(*b*) shows that the port P3 is switched to the output port to thereby output the high-frequency signal at the frequency f2 from the port P3. The frequencies f1 and f2 of the high-frequency signals output from the ports P2 and P3, respectively, can be set freely within the variable frequency range of the high-frequency power source.

Configuration Example 7

Configuration Example 7 of the nonreciprocal circuit element of the present invention will be described based on FIGS. 9 and 10.

Configuration Example 7 includes a plurality of units having different frequency characteristics, and outputs the high-frequency signal from a nonreciprocal circuit element of the unit that has frequency characteristics suitable for the frequency of a high-frequency signal input from the high-frequency power source.

There is a limit in the variable frequency range of the variable frequency characteristics defined by changing the DC magnetic field, and when the variable frequency range of the high-frequency power source is wide, it is difficult to make an adjustment to the entire variable frequency range by one nonreciprocal circuit element. Configuration Example 7 uses the plurality of units having the frequency characteristics, of which frequency ranges to be separated are different, to separate high-frequency signals at frequencies in different frequency ranges for each unit, so as to be able to separate signals for the entire variable frequency range of the high-frequency power source.

Each unit 20 includes the nonreciprocal unit 6, the reciprocal circuit unit 5 and the DC power source control unit 9. Configuration Example 7 shows a configuration having three units 20A, 20B and 20C as a plurality of units 20.

The reciprocal circuit units 5 included in the unit 20A, 20B and 20C set constants corresponding to respective frequency ranges. The nonreciprocal unit 6 of each of the units 20A, 20B, 20C shifts the frequency characteristics of the center frequency defined by the reciprocal circuit unit 5 by controlling the DC magnetic field of the electromagnet 4, so as to broaden the frequency range to be separated.

By shifting the frequency range to be separated by each of the units 20A, 20B, 20C, the total frequency range of the nonreciprocal circuit element becomes a combination of the frequency ranges of the units, and thereby the frequency range can be broadened.

FIG. 10 schematically shows that the frequency characteristics of the nonreciprocal circuit element is implemented by the plurality of units according to Configuration Example 7. FIG. 10 is an example in which an entire frequency bandwidth BW of the nonreciprocal circuit element is configured by combining three frequency widths, namely a frequency width BW1, a frequency width BW2 and a frequency width BW3. In this configuration example, the frequency characteristics of the units 20A, 20B and 20C are set by setting frequencies fc1, fc2 and fc3 as center frequencies, and the frequency widths BW1, BW2 and BW3 are set.

FIG. 10(*a*) shows the frequency width BW1 in the unit 20A that is acquired by varying the DC magnetic field of the electromagnet and thus shifting the frequency characteristics which has the frequency fc1 as the center frequency. The frequency width BW1 is set by shifting the frequency characteristics.

FIG. 10(*b*) shows the frequency width BW2 of the frequency characteristics that defines the frequency fc2 as a center frequency in the unit 20B. FIG. 10(*c*) shows the frequency width BW3 of the frequency characteristics that defines the frequency fc3 as a center frequency in the unit 20C.

The frequency width for shifting the frequency characteristics can be set by a variation width for the frequency characteristics which can be varied due to the change in the DC magnetic field of the electromagnet, based on the relationship between the variation width for the DC magnetic field of the electromagnet and the variation width for the frequency characteristics.

FIG. 10(*d*) shows that the total frequency bandwidth BW of the nonreciprocal circuit element is formed by combining the frequency width BW1, BW2 and BW3 of the unit 20A, 20B and 20C.

According to Configuration Example 7, even when the frequency bandwidth of the frequency characteristics adjustable by each unit is narrow, the combination of multiple units having the frequency characteristics of the different center frequencies can broaden the total frequency bandwidth BW of the nonreciprocal circuit element, thereby achieving wider bandwidth.

In each configuration example, a reverse direction loss (isolation) which is a power loss portion due to a return of reflection generated at the output port of the circulator can be detected by adding power supply detection units to the port P2 and the port P3, in addition to the power supply detection unit provided to the port P1.

In a case where the circulator is used for transmitting the high-frequency current from the port P1 to a load of the port P2, from the load of the port P2 to a load of the port P3, and from the load of the port P3 to the port P1, the power supply detection unit provided to the port P2 detects a quantity of electricity reflected from a load connected to an output part of the circulator, and the power supply detection unit provided to the port P3 detects a quantity of electricity reflected from the load and input to the circulator.

The reverse direction loss can be obtained by an adding operation of the quantity of electricity detected by these power supply detection units. The detected quantity of electricity is fed back to the DC power source control unit so as to be able to apply control to reduce the reverse direction loss.

The above-described embodiments and variations are some examples of the nonreciprocal circuit element of the invention, and the invention is not limited to these embodiments. The present invention can be varied based on the gist of the invention, and such variations will not be excluded from the scope of the invention.

INDUSTRIAL APPLICABILITY

The nonreciprocal circuit element of the present invention can be applied to, for example, a power source (RF generator) for outputting a high frequency that is used for semiconductor manufacturing equipment, liquid crystal panel manufacturing equipment and others.

REFERENCE SIGNS LIST

1 Nonreciprocal Circuit Element
2, 2*a*, 2*b* Ferrite
3, 3*a*, 3*b* Conductor
4 Electromagnet
5, 5*a*, 5*b*, 5*c* Reciprocal Circuit Unit
6 Nonreciprocal Unit
7 DC Power Source
8 High-Frequency Power Source
9 DC Power Source Control Unit
10 Power Supply Detection Unit
11 Frequency Control Unit
12 Frequency Detection Unit
13 Constant Variation Unit
14 Control Unit
20, 20A, 20B, 20C Unit
100 Ideal Circulator
101 Lumped Constant Circulator
102 Ferrite
103, 103*a*, 103*b*, 103*c* Conductor
104, 104*a*, 104*b* Permanent Magnet
105, 105*a*, 105*b*, 105*c* Capacitor
106, 106*a*, 106*b*, 106*c* Parallel-Resonant Circuit
BW Frequency Bandwidth
BW1, BW2, BW3 Frequency Width
Cp Capacitance Constant
Hdc Magnetic Field Intensity of DC Magnetic Field
Idc DC Current
Lp Inductor
P1, P2, P3 Port
ΔP Insertion Loss
ΔPre Insertion Loss
ΔPire Insertion Loss
ΔPs Insertion Loss
fc, fc1, fc2, fc3 Center Frequency
η Nonreciprocal Index

The invention claimed is:

1. A nonreciprocal circuit element, comprising:
a nonreciprocal unit having ferrite, an electromagnet that applies a DC magnetic field to the ferrite, and a plurality of conductors arranged to intersect one another in an insulated state with respect to the ferrite and have a plurality of shorted end terminals;
a reciprocal circuit unit connected between the other end terminal of each conductor and a respective input/output port and configured to vary a resonant frequency of the parallel-resonant circuit formed by an inductance of each conductor of the plurality of conductors of the nonreciprocal unit and a capacitor of the the reciprocal circuit unit; and
a DC power source control unit that controls a DC current supplied to the electromagnet based on a high-frequency signal from a high-frequency power source applied to the nonreciprocal unit,
wherein the DC power source control unit controls the DC current supplied to the electromagnet to vary intensity of the DC magnetic field applied to the ferrite, thereby controlling frequency characteristics of the nonreciprocal unit.

2. The nonreciprocal circuit element according to claim 1, wherein the DC power source control unit controls a current value of the DC current based on a quantity of supplied electricity of the high-frequency signal from the high-frequency power source applied to the nonreciprocal unit to vary the intensity of the DC magnetic field, and matches a center frequency of the frequency characteristics of the nonreciprocal unit with a frequency of the high-frequency signal of the high-frequency power source.

3. The nonreciprocal circuit element according to claim 2, comprising a power supply detection unit disposed between the high-frequency power source and the reciprocal circuit unit connected to the respective input/output port for detecting the quantity of supplied electricity,
wherein the quantity of supplied electricity is any one of voltage, current, electric power and reflectance.

4. The nonreciprocal circuit element according to claim 1, wherein the DC power source control unit controls the DC current based on a frequency of the high-frequency signal from the high-frequency power source to the nonreciprocal unit to vary the intensity of the DC magnetic field, thereby matching a center frequency of the frequency characteristics of the nonreciprocal unit with the high-frequency signal of the high-frequency power source.

5. The nonreciprocal circuit element according to claim 4, comprising a frequency detection unit between the high-frequency power source and the reciprocal circuit unit connected to the respective input/output port for detecting the frequency of the high-frequency signal,
wherein the DC power source control unit controls the DC current based on the frequency detected by the frequency detection unit.

6. The nonreciprocal circuit element according to claim 4, comprising a frequency control unit for controlling the frequency of the high-frequency power source,
wherein the DC power source control unit controls the DC current based on a control frequency of the frequency control unit.

7. The nonreciprocal circuit element according to claim 1, comprising a constant variation unit that varies a capacitance of the capacitor of the reciprocal circuit unit,
wherein the constant variation unit changes the capacitance of the capacitor of the reciprocal circuit unit based on a frequency of the high-frequency signal of the high-frequency power source,
varies the resonant frequency of the parallel-resonant circuit in response to the change in the capacitance, and
in response to the change in the resonant frequency, with respect to the nonreciprocal unit
(a) changes the frequency characteristics for matching a center frequency with the frequency of the high-frequency signal of the high-frequency power source; and
(b) performs impedance matching to match impedances between the input/output ports.

8. The nonreciprocal circuit element according to claim 1, comprising a plurality of units that each includes the nonreciprocal unit, the reciprocal circuit unit and the DC power source control unit,
wherein the nonreciprocal unit of each unit has frequency characteristics with a different center frequency and outputs the high-frequency signal in a different frequency band from each unit.

9. The nonreciprocal circuit element according to claim 1, wherein the DC power source control unit changes a direction of the DC current supplied to the electromagnet to switch the respective input/output port for outputting the high-frequency signal from the nonreciprocal unit.

10. The nonreciprocal circuit element according to claim 9, wherein the DC power source control unit varies the current value in addition to changing the current direction of the DC current, so as to switch the respective input/output port and change the frequency characteristics.

* * * * *